Patented Feb. 20, 1934

1,947,550

UNITED STATES PATENT OFFICE 1,947,550

AZO DYES

Emmet F. Hitch, Wilmington, Del., assignor to E. I. du Pont de Nemours & Company, Wilmington, Del., a corporation of Delaware No Drawing. Application August 9, 1929
Serial No. 384,787

47 Claims. (Cl. 8—5)

This invention relates to a new class of azo dyes and the process of their preparation. More specifically, it is concerned with mono-azo dyes of the "naphthol" type.

The object of the invention is to produce a new class of dyes which are practically insoluble in water, are valuable as pigment colors and when developed on the fiber will dye the fabric orange to red to blue shades of excellent fastness. A further object is the production of dyes of excellent tinctorial power.

The new compounds may be represented by the general formula

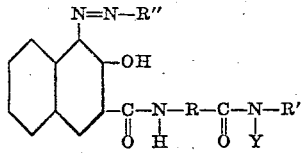

wherein R represents a radical of the benzene series not containing a sulfonic or carboxylic acid group, R' represents an organic radical of the aliphatic or aromatic series not containing a sulfonic or carboxylic acid group, R" represents an aromatic residue not containing a sulfonic or carboxylic acid group and Y may be hydrogen, an alkyl radical or an aromatic radical.

These dyes may be obtained by combining any diazo compound not containing a sulfonic or carboxylic acid group with derivatives of 2-hydroxy-3-naphthoic acid having the general formula

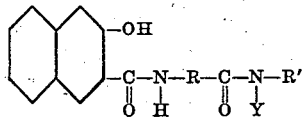

in which R represents any radical of the benzene series not containing a sulfonic or carboxylic acid group, R' represents any organic radical of the aliphatic or aromatic series not containing a sulfonic or carboxylic acid group, and Y is hydrogen or an aliphatic or aromatic radical.

The preparation of such derivatives of 2-hydroxy-3-naphthoic acid is described in my copending application Serial No. 383,978, filed August 6, 1929, issued as Patent No. 1,909,960 of May 23, 1933. In general it may be stated here that these derivatives may be prepared by condensing nitro-benzoic acids which do not contain a carboxylic or sulfonic acid group, or their chlorides or substituted nitro-benzoic acids or their chlorides with a primary or secondary amine of the aliphatic or aromatic series, which amine does not contain a sulfonic or carboxylic acid substituent, or with a mixed aliphatic and aromatic secondary amine, reducing the nitro group of the resulting product and condensing the aminoaroyl-amino compounds thus formed under suitable conditions with 2-hydroxy-3-naphthoic acid.

The new mono-azo dyes and the method of their preparation may be best disclosed by the presentation of a number of examples of actual embodiments thereof. It is to be understood, of course, that these examples are furnished merely by way of illustration and that the details of procedure set forth therein as well as the particular proportions, reagents, temperatures, etc., therein specified are susceptible of variation and substitution. Such examples follow.

Example 1

The cotton is impregnated with a solution prepared by dissolving 10 parts of 2-hydroxy-3-naphthoyl - p - amino - benzoyl - aniline in 1000 parts of water containing 4 parts of sodium hydroxide. It is wrung out and developed in a diazo solution prepared in the usual manner from 7.5 parts of m-nitro-p-toluidine in 1000 parts of water. The yarn is then rinsed and soaped in boiling water. A bright shade of red is obtained. The dye most probably has the formula

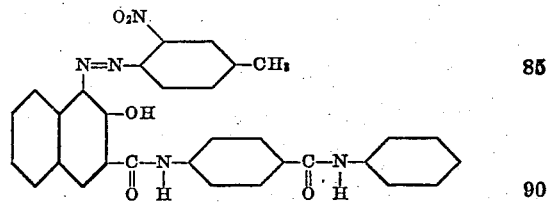

Example 2

The cotton is impregnated with a solution prepared by dissolving 10 parts of 2-hydroxy-3-naphthoyl-p-amino-benzoyl-n-butylamine in 1000 parts of water containing 4 parts of caustic soda. It is wrung out and developed in a diazo solution prepared in the usual manner from 7.5 parts of 2:5-dichloroaniline in 1000 parts of water. After rinsing and soaping a bright yellowish-red color is produced on the fiber. It probably has the formula

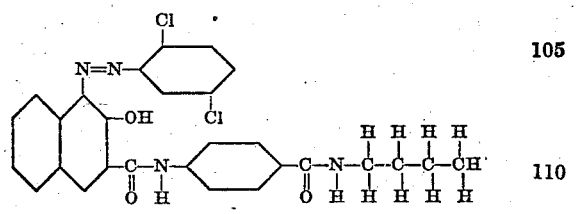

Example 3

Ten parts of 2-hydroxy-3-naphthoyl-p-aminobenzoyl-aniline and 4 parts of caustic soda are dissolved in 1000 parts of water. To this is added slowly, with agitation, a diazo solution obtained from 5 parts of p-chloro-o-anisidine in 100 parts of water. The red dye is filtered off, washed well with water and dried. It is a very dark red powder, insoluble in water, and gives a blue color in concentrated sulfuric acid. It probably has the formula

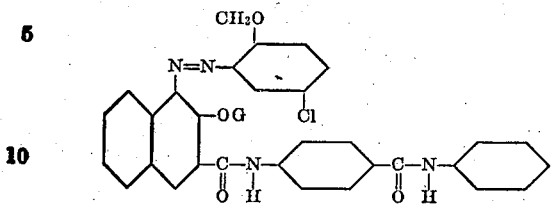

Example 4

Ten parts of 2-hydroxy-3-naphthoyl-p-amino-benzoyl-ethylaniline and 4 parts of caustic soda are dissolved in a mixture of 200 parts of ethyl alcohol and 500 parts of water. To this is added a diazo solution prepared in the usual manner from 4.3 parts of m-nitro-p-toluidine in 100 parts of water. The dye is filtered off, washed well with water, and dried. It is a dark red insoluble powder and gives a purple color in cold, concentrated sulfuric acid. The formula for this dye is probably

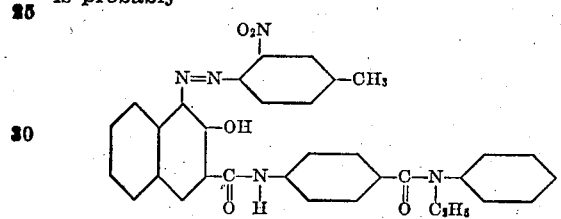

Example 5

Ten parts of 2-hydroxy-3-naphthoyl-m-amino-p-toluyl-aniline is dissolved in a mixture of 2 parts of caustic soda, 100 parts of alcohol and 500 parts of water. To this is added, with agitation, a diazo solution obtained in the usual manner from 4 parts of ortho-chloroaniline in 100 parts of water. The product is filtered off, washed well with water, and dried. It is a light red powder and gives a reddish-purple color in cold, concentrated sulfuric acid. The formula for this dye is probably

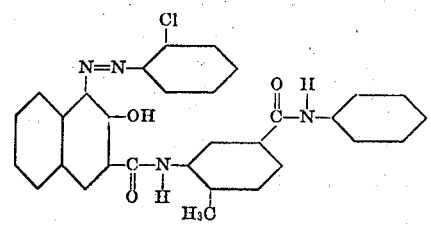

The dyes obtained as illustrated in the above examples are not readily soluble in water and are only difficultly soluble in most organic solvents. They may be used for the production of color lakes of excellent fastness and when produced on the fiber give orange to red to blue shades which are very fast to washing. The following table indicates the shades of some of the dyes as free compounds and as produced on cotton fiber.

| Arylide of b-hydroxy-naphthoic acid | Diazo of | Shade | |
|---|---|---|---|
| | | Of dye | On fiber |
| b-Hydroxy-naphthoyl-p-amino-benzanilide | m-Nitro-p-toluidine | Dark red | Bright red. |
| b-Hydroxy-naphthoyl-p-amino-benzanilide | p-Chloro-o-anisidine | Dark red | Bright red. |
| b-Hydroxy-naphthoyl-p-amino-benzanilide | 5-chloro-o-toluidine | Dark red | Bright red (sli. yellow). |
| b-Hydroxy-naphthoyl-p-amino-benzanilide | 4-chloro-o-nitro-aniline | Very dark red | Bright red. |
| b-Hydroxy-naphthoyl-p-amino-benzanilide | Ortho-nitroaniline | Red | Bright red. |
| b-Hydroxy-naphthoyl-p-amino-benzanilide | p-Nitro-o-anisidine | Dark red | Bright red. |
| b-Hydroxy-naphthoyl-p-amino-benzanilide | 2:5-dichloroaniline | Yellowish-red | Orange. |
| b-Hydroxy-naphthoyl-p-amino-benzanilide | m-Nitroaniline | Orange | Orange. |
| b-Hydroxy-naphthoyl-p-amino-benzanilide | Dianisidine | Blue | Blue. |
| b-Hydroxy-naphthoyl-p-amino-benzoyl-n-butylamine | m-Nitro-p-toluidine | Dark red | Bright red. |
| b-Hydroxy-naphthoyl-p-amino-benzoyl-n-butylamine | 2:5-Dichloroaniline | Yellowish-red | Orange. |
| b-Hydroxy-naphthoyl-p-amino-benzoyl-o-toluidine | m-Nitro-p-toluidine | Dark red | Red. |
| b-Hydroxy-naphthoyl-p-amino-benzoyl-o-anisidine | 2:5-dichloroaniline | Bright red | Orange. |
| b-Hydroxy-naphthoyl-p-amino-benzoyl-b-naphthylamine | m-Nitro-p-toluidine | Dark red | Red. |
| b-Hydroxy-naphthoyl-p-amino-benzoyl-b-naphthylamine | Dianisidine | Blue | Blue. |
| b-Hydroxy-naphthoyl-p-amino-benzoyl-ethylaniline | m-Nitro-p-toluidine | Red | Red (sli. yellow). |
| b-Hydroxy-naphthoyl-m-amino-p-toluyl-aniline | m-Nitro-p-toluidine | Dark red | Red. |
| b-Hydroxy-naphthoyl-m-amino-p-toluyl-aniline | Ortho-nitroaniline | Red | Red. |
| b-Hydroxy-naphthoyl-m-amino-p-toluyl-aniline | Ortho-chloroaniline | Red | Orange. |
| b-Hydroxy-naphthoyl-p-amino-benzoyl-2:5-dichloroaniline | m-Nitro-p-toluidine | Red | Yellowish-red. |

The class of dyes described hereinabove obviously embraces a large number of compounds in which the radicals R, R' and R'' may contain various substituents. However, the preferred class of products includes those derived from derivatives of 2-hydroxy-3-naphthoic acid of the general formula given above in which Y, in the formula, is either hydrogen or an aliphatic radical and R' is an aromatic radical. Of this preferred class those azo dyes derived from 2-hydroxy-3-naphthoyl-p-amino-benzoyl-aniline (prepared from 2-hydroxy-3-naphthoic acid, aniline and nitro-benzoyl chloride) are especially valuable. As already stated, any diazo compound adapted to couple with derivatives of the type described may be employed as the other coupling component but we have found the dyes resulting from coupling the diazo body of meta-nitro-para-toluidine with the 2-hydroxy-3-naphthoic acid derivatives of the preferred class and especially with 2-hydroxy-3-naphthoyl-p-amino-benzoyl-aniline to be of particular value.

As many apparent and widely different embodiments of this invention may be made without departing from the spirit thereof, it is to be understood that I do not limit myself to the foregoing examples or description except as indicated in the following claims.

I claim:

1. An azo dye of the general formula

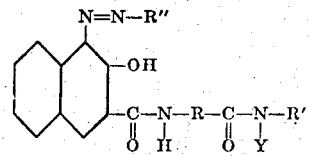

wherein R represents a radical of the benzene series, R' represents an aromatic or aliphatic radical, R'' represents an aromatic residue and Y represents a substituent of the class consisting of hydrogen and aromatic and aliphatic radicals, said azo dye being free from sulfonic or carboxylic acid groups.

2. An azo dye of the general formula

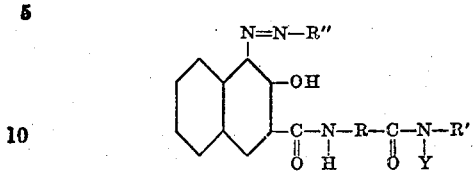

wherein R represents a radical of the benzene series, R' represents an aromatic or aliphatic radical, R" represents an aromatic residue and Y represents a substituent of the class consisting of hydrogen and aliphatic radicals, said azo dye being free from sulfonic or carboxylic acid groups.

3. An azo dye of the general formula

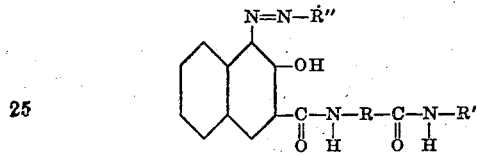

wherein R represents a radical of the benzene series, R' represents an aromatic or aliphatic radical, and R" represents an aromatic residue, said azo dye being free from sulfonic or carboxylic acid groups.

4. An azo dye of the general formula

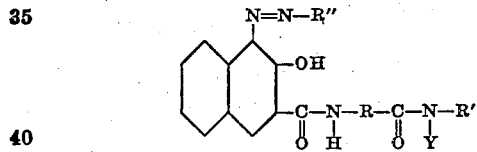

wherein R represents an aromatic radical of the benzene series, R' represents an aromatic radical, R" represents an aromatic residue and Y represents a substituent of the class consisting of hydrogen and aliphatic radicals, said azo dye being free from sulfonic or carboxylic acid groups.

5. An azo dye of the general formula

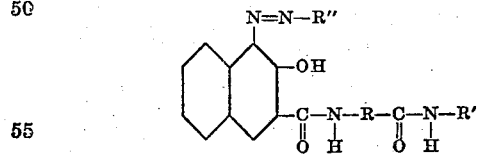

wherein R represents a radical of the benzene series, R' represents an aromatic radical, and R" represents an aromatic residue, said azo dye being free from sulfonic or carboxylic acid groups.

6. An azo dye of the general formula

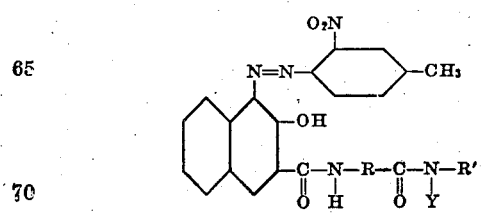

wherein R represents a radical of the benzene series, R' represents an aromatic or aliphatic radical, and Y represents a substituent of the class consisting of hydrogen and aromatic and aliphatic radicals, said azo dye being free from sulfonic or carboxylic acid groups.

7. An azo dye of the general formula

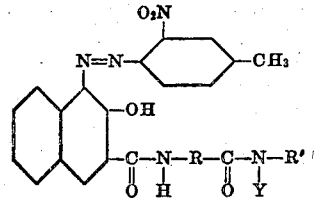

wherein R represents a radical of the benzene series, R' represents an aromatic or aliphatic radical, and Y represents a substituent of the class consisting of hydrogen and aliphatic radicals, said azo dye being free from sulfonic or carboxylic acid groups.

8. An azo dye of the general formula

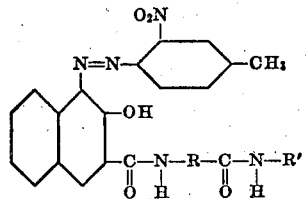

wherein R represents a radical of the benzene series, and R' represents an aromatic radical, said azo dye being free from sulfonic or carboxylic acid groups.

9. An azo dye having the formula

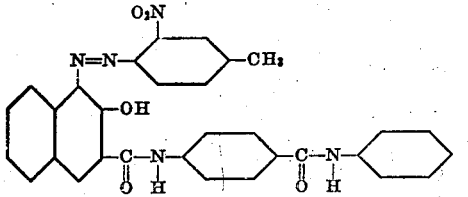

which is prepared by coupling the diazo body of m-nitro-p-toluidine with 2-hydroxy-3-naphthyol-p-amino-benzoyl-aniline, and is bright red in shade.

10. The process of preparing an azo dye which comprises coupling an aromatic diazo compound not containing a sulfonic or carboxylic acid group to a derivative of 2-hydroxy-3-naphthoic acid which is free from carboxylic or sulfonic acid groups and has the general formula

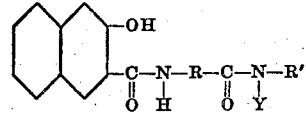

in which R represents a radical of the benzene series not containing a sulfonic acid or carboxylic acid group, R' represents an organic radical of the aliphatic or aromatic series not containing a sulfonic or carboxylic acid group and Y is hydrogen, an aryl or an alkyl radical.

11. The process of preparing an azo dye which comprises coupling an aromatic diazo compound not containing a sulfonic or carboxylic acid group to a derivative of 2-hydroxy-3-naphthoic acid which is free from carboxylic or sulfonic acid groups and has the general formula

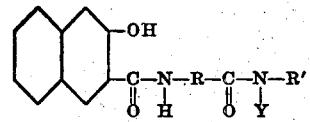

in which R represents a radical of the benzene series not containing a sulfonic acid or carboxylic acid group, R' represents an organic radical of the aliphatic or aromatic series not containing a sulfonic or carboxylic acid group and Y represents hydrogen or an alkyl radical.

12. The process of preparing an azo dye which comprises coupling an aromatic diazo compound not containing a sulfonic or carboxylic acid group to a derivative of 2-hydroxy-3-naphthoic acid which is free from carboxylic or sulfonic acid groups and has the general formula

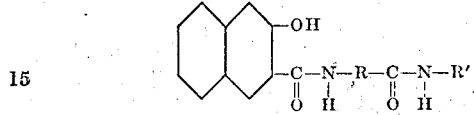

in which R represents a radical of the benzene series not containing a sulfonic acid or carboxylic acid group, and R' represents an organic radical of the aliphatic or aromatic series not containing a sulfonic or carboxylic acid group.

13. The process of preparing an azo dye which comprises coupling an aromatic diazo compound not containing a sulfonic or carboxylic acid group to a derivative of 2-hydroxy-3-naphthoic acid which is free from carboxylic or sulfonic acid groups and has the general formula

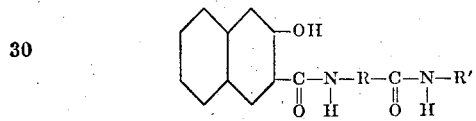

in which R and R' represents radicals of the benzene series not containing a sulfonic acid or carboxylic acid group.

14. The process of preparing an azo dye which comprises coupling an aromatic diazo compound not containing a sulfonic or carboxylic acid group and 2 - hydroxy - 3 - naphthoyl - p - amino - benzoyl-aniline.

15. The process of claim 11 wherein the diazo compound is the diazo body of m-nitro-p-toluidine.

16. The process of claim 13 wherein the diazo compound is the diazo body of m-nitro-p-toluidine.

17. The process of preparing azo dyes on the fiber to be dyed which consists in impregnating the fiber with a derivative of 2-hydroxy-3-naphthoic acid of the type set forth in claim 11 and developing the color by immersing the imprgenated fiber in a solution of an aromatic diazo compound not containing a sulfonic or carboxylic acid.

18. The process of preparing azo dyes on the fiber to be dyed which consists in impregnating the fiber with a derivative of 2-hydroxy-3-naphthoic acid of the type set forth in claim 11 and developing the color by immersing the impregnated fiber in a solution of the diazo body of m-nitro-p-toluidine.

19. Textile dyed with a dye of the class set forth in claim 2.

20. Textile dyed with the dye of claim 9.

21. An azo dye of the general formula

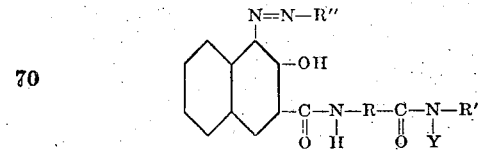

wherein R represents a radical of the benzene series, R' represents an aliphatic radical or an aromatic radical of the benzene and naphthalene series, R'' represents an aromatic residue of the benzene series and Y represents a substituent of the class consisting of hydrogen and aliphatic radicals, said azo dye being free from sulfonic or carboxylic acid groups.

22. An azo dye of the general formula

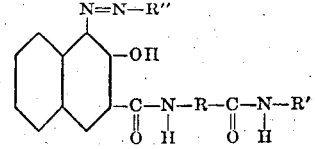

wherein R represents a radical of the benzene series, R' represents an aliphatic radical or an aromatic radical of the benzene and naphthalene series, and R'' represents an aromatic residue of the benzene series, said azo dye being free from sulfonic or carboxylic acid groups.

23. An azo dye of the general formula

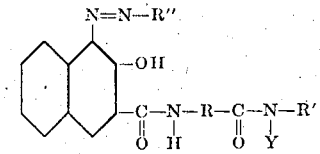

wherein R represents an aromatic radical of the benzene series, R' represents an aromatic radical of the benzene and naphthalene series, R'' represents an aromatic residue of the benzene series and Y represents a substituent of the class consisting of hydrogen and aliphatic radicals, said azo dye being free from sulfonic or carboxylic acid groups.

24. An azo dye of the general formula

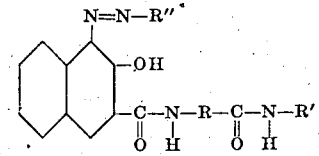

wherein R represents a radical of the benzene series, R' represents an aromatic radical of the benzene and naphthalene series, and R'' represents an aromatic residue of the benzene series, said azo dye being free from sulfonic or carboxylic acid groups.

25. An azo dye of the general formula

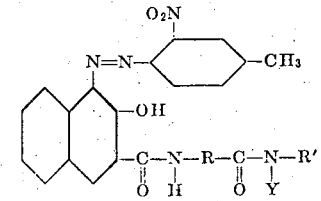

wherein R represents a radical of the benzene series, R' represents an aliphatic radical or an aromatic radical of the benzene and naphthalene series, and Y represents a substituent of the class consisting of hydrogen and aliphatic radicals, said azo dye being free from sulfonic or carboxylic acid groups.

26. An azo dye of the general formula

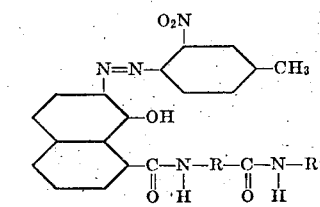

wherein R represents a radical of the benzene series, and R' represents an aromatic radical of the benzene and naphthalene series, said azo dye being free from sulfonic or carboxylic acid groups.

27. The process of preparing an azo dye which comprises coupling a diazo compound of the benzene series not containing a sulfonic or carboxylic acid group to a derivative of 2-hydroxy-3-naphthoic acid which is free from carboxylic or sulfonic acid groups and has the general formula

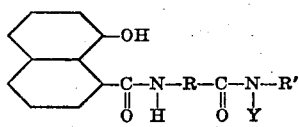

in which R represents a radical of the benzene series not containing a sulfonic acid or carboxylic acid group, R' represents an organic radical of the aliphatic series or an aromatic radical of the benzene and naphthalene series not containing a sulfonic or carboxylic acid group and Y represents hydrogen or an alkyl radical.

28. The process of preparing an azo dye which comprises coupling a diazo compound of the benzene series not containing a sulfonic or carboxylic acid group to a derivative of 2-hydroxy-3-naphthoic acid which is free from carboxylic or sulfonic acid groups and has the general formula

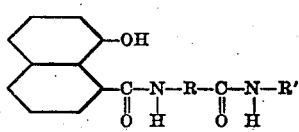

in which R represents a radical of the benzene series not containing a sulfonic acid or carboxylic acid group, and R' represents an organic radical of the aliphatic series or an aromatic radical of the benzene and naphthalene series not containing a sulfonic or carboxylic acid group.

29. The process of preparing an azo dye which comprises coupling a diazo compound of the benzene series not containing a sulfonic or carboxylic acid group to a derivative of 2-hydroxy-3-naphthoic acid which is free from carboxylic or sulfonic acid groups and has the general formula

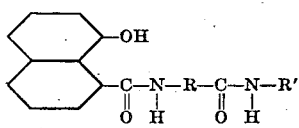

in which R and R' represent radicals of the benzene series not containing a sulfonic acid or carboxylic acid group.

30. The process of preparing an azo dye which comprises coupling a diazo compound of the benzene series not containing a sulfonic or carboxylic acid group and 2-hydroxy-3-naphthoyl-p-amino-benzoyl-aniline.

31. The process of claim 27 wherein the diazo compound is the diazo body of m-nitro-p-toluidine.

32. The process of claim 29 wherein the diazo compound is the diazo body of m-nitro-p-toluidine.

33. The process of preparing azo dyes on the fiber to be dyed which consists in impregnating the fiber with a derivative of 2-hydroxy-3-naphthoic acid of the type set forth in claim 27 and developing the color by immersing the impregnated fiber in a solution of a diazo compound of the benzene series not containing a sulfonic or carboxylic acid group.

34. The process of preparing azo dyes on the fiber to be dyed which consists in impregnating the fiber with a derivative of 2-hydroxy-3-naphthoic acid of the type set forth in claim 27 and developing the color by immersing the impregnated fiber in a solution of the diazo body of m-nitro-p-toluidine.

35. Textile dyed with a dye of the class set forth in claim 21.

36. An azo dye of the general formula

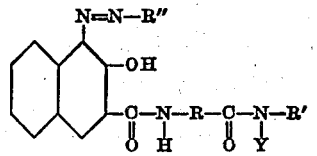

wherein R represents a radical of the benzene series, R' represents an aromatic or aliphatic radical, R" represents an aromatic residue of the benzene series and Y represents a substituent of the class consisting of hydrogen and aliphatic radicals, said azo dye being free from sulfonic or carboxylic acid groups.

37. An azo dye of the general formula

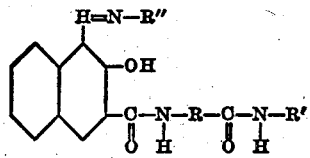

wherein R represents a radical of the benzene series, R' represents an aromatic or aliphatic radical, and R" represents an aromatic residue of the benzene series, said azo dye being free from sulfonic or carboxylic acid groups.

38. An azo dye of the general formula

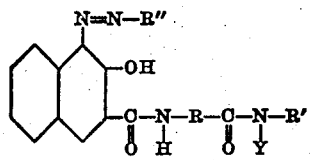

wherein R represents an aromatic radical of the benzene series, R' represents an aromatic radical, R" represents an aromatic residue of the benzene series and Y represents a substituent of the class consisting of hydrogen and aliphatic radicals, said azo dye being free from sulfonic or carboxylic acid groups.

39. An azo dye of the general formula

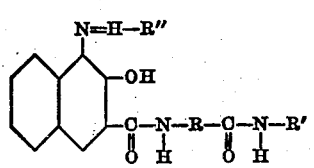

wherein R represents a radical of the benzene series, R' represents an aromatic radical of the benzene series, and R" represents an aromatic residue of the benzene series, said azo dye being free from sulfonic or carboxylic acid groups.

40. An azo dye of the general formula

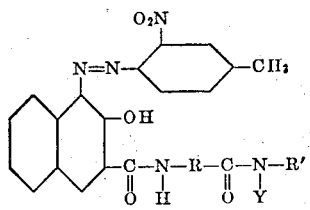

wherein R represents a radical of the benzene series, R' represents an aromatic or aliphatic radical, and Y represents a substituent of the class consisting of hydrogen and aliphatic radicals, said azo dye being free from sulfonic or carboxylic acid groups.

41. The process of preparing an azo dye which comprises coupling an aromatic diazo compound of the benzene series not containing a sulfonic or carboxylic acid group to a derivative of 2-hydroxy-3-naphthoic acid which is free from carboxylic or sulfonic acid groups and has the general formula

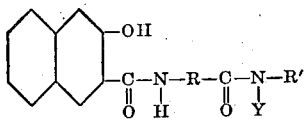

in which R represents a radical of the benzene series not containing a sulfonic acid or carboxylic acid group, R' represents an organic radical of the aliphatic or aromatic series not containing a sulfonic or carboxylic acid group and Y is hydrogen or an alkyl radical.

42. The process of preparing an azo dye which comprises coupling an aromatic diazo compound of the benzene series not containing a sulfonic or carboxylic acid group to a derivative of 2-hydroxy-3-naphthoic acid which is free from carboxylic or sulfonic acid groups and has the general formula

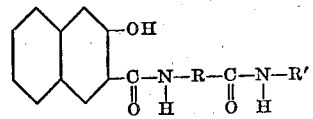

in which R represents a radical of the benzene series not containing a sulfonic acid or carboxylic acid group, and R' represents an organic radical of the aliphatic or aromatic series not containing a sulfonic or carboxylic acid group.

43. Colored textile material whose color is due at least in part to the dye of claim 36.

44. Colored textile material whose color is due at least in part to the dye of claim 4.

45. The azo dye probably having the formula

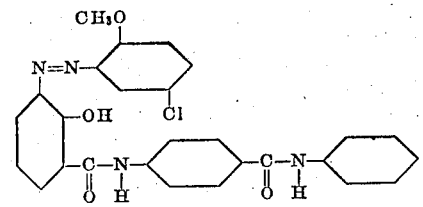

which is prepared by coupling the diazo body of para-chloro-ortho-anisidine with 2-hydroxy-3-naphthoyl-para-amino-benzoyl aniline which is a very dark red solid insoluble in water and which gives a blue color in concentrated sulphuric acid.

46. The azo dye probably having the formula

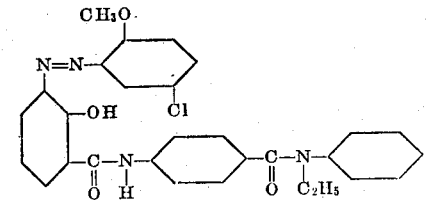

which is a red solid and insoluble in water.

47. The azo dyes probably having the formula

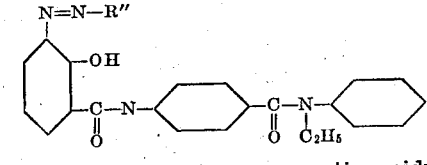

in which R" represents an aromatic residue and which are insoluble in water.

EMMET F. HITCH.

CERTIFICATE OF CORRECTION

Patent No. 1,947,550.                                                                    February 20, 1934.

EMMET F. HITCH

It is hereby certified that errors appear in the printed specification of the above numbered patent requiring correction as follows: Page 1, line 55, for "of" read *or*; Page 4, claim 26, and page 5, claims 27, 28 and 29, in the formula, change the position of the double benzene rings from horizontal to vertical; claim 37, line 1 of the formula, for "H=N—R''''" read *N=N—R''*; claim 39, line 1 of the formula, for "N=H—R''''" read *N=N—R''*; and that the said Letters Patent should be read with these corrections therein that the same may conform to the record of the case in the Patent Office.

Signed and sealed this 3rd day of April, A. D. 1934.

[SEAL]

F. M. HOPKINS,
*Acting Commissioner of Patents.*